Sept. 27, 1932.  G. J. BER  1,880,168

SOFT COLLAR HOLDER

Filed May 25, 1931

Fig. 4ª.

Inventor
George J. Ber

By
Attorney

Patented Sept. 27, 1932

1,880,168

UNITED STATES PATENT OFFICE

GEORGE J. BER, OF RAYNE, LOUISIANA

SOFT COLLAR HOLDER

Application filed May 25, 1931. Serial No. 539,887.

My invention relates to improvements in soft collar holders, and one object of my invention is the provision of a device of very simple and inexpensive construction capable of easy application and removal from the collar, and which will retain the collar in a neat and attractive manner.

Another object of my invention is the provision of a soft collar holder which will permit adjustment to the collar and to the opposing ends of said collar to insure the collar being retained in the proper neat and attractive manner.

To attain these objects my invention consists of a collar holder embodying novel details of construction and combinations of parts substantially as described and claimed and as shown in the accompanying drawing, in which:

Figure 1 represents a front elevation of my device in position upon the end of the collar, said collar being shown in dotted line.

Fig. 2 represents a front elevation of a modified form of the collar holder.

Fig. 3 represents a front elevation of a further modified form.

Figure 1:
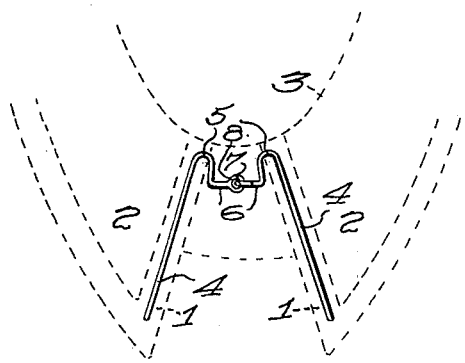
Figure 5:
Fig. 5 represents a front elevation of another modified form of my invention.

My invention is adapted to be applied to the pockets 1 in the ends 2 of the collar 3, shown in dotted lines in Fig. 1, and consists of twin members each comprising a long arm 4, which fits in said pockets 1 of the collar, and said arms are formed with the bend 5 and the horizontal terminals 6, said terminals in Figs. 1, 2, 3 and 5 being formed one with a hook 7, and the other with an eye 8, which receives said hook, the form shown in Fig. 5 being provided with a series of eyes 8', which permit adjustment of the twin members of the holder according to the desire of the user.

From this construction it will be noted that the bends in the members have the effect of giving a slight spring action to the holder and that the arms serve to hold the ends of the collar in a perfectly smooth and neat position.

Figure 2:
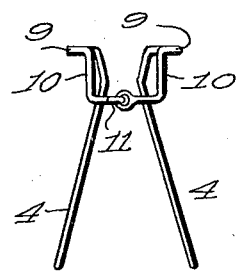
Figure 4:
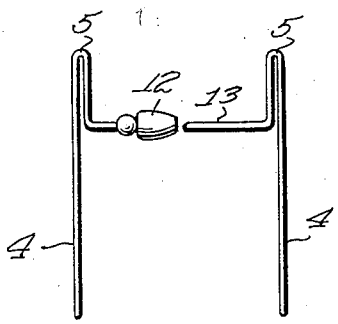
Fig. 4 represents a front elevation of a still further modified construction of the collar holder, and Fig. 4ᵃ is a detail view showing the horizontal terminals of the members and the adjusting device carried by one of the terminals to receive the opposing terminal and arranged out of line to allow passage of the terminal through the adjusting device.
Figure 3:
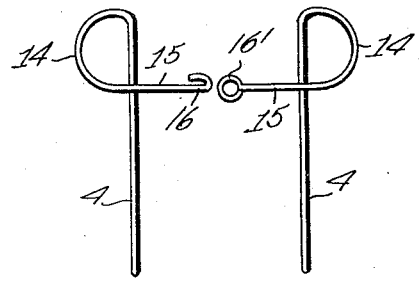
Figure 3:
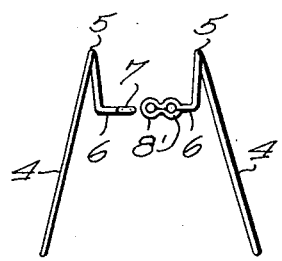
Figure 3:
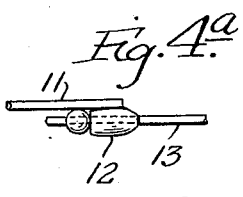

In the form of my invention shown in Fig. 2, the arms are formed near their upper end with the outwardly bent portion 9 and the vertically disposed bends 10, which terminate in the terminals 11. In the form shown in Fig. 4 to one of the terminals is connected the sleeve adjusting device 12 of the conventional spring clutch type having an axial passage which receives the terminal 13 of the twin member and this adjusting device is out of line to permit the terminal to be easily inserted and adjusted without interference. In the form shown in Fig. 3 the arms are provided with the outward disposed bends 14 terminating in the terminals 15 disposed horizontally and provided one with a hook 16 and the other with an eye 16', which receives said hook, while in Fig. 5 one of the terminals is provided with a series of eyes 8' which receive the hook 7 on the twin member and serve to permit an adjustment of the members with reference to each other.

From an examination of the drawing in connection with this description, the operation of my invention will be readily understood, and it will be readily apparent that the holder can be applied quickly and removed with ease and which acts to hold the ends of the collar in an attractive and embellishing manner to greatly add to the appearance of the collar while being of such cheap construction as to make its use highly necessary and desirable.

I claim:

A soft collar holder, consisting of a pair of members each composed of a single piece of material, and comprising a long vertical arm for connection with the collar and a short horizontal arm connected thereto, and a spring clutch mounted on the end of one of said horizontal arms at one side and adapted to adjustably receive the end of the other horizontal arm.

In testimony whereof I affix my signature.

GEORGE J. BER.